(12) United States Patent
Ritchie

(10) Patent No.: US 7,511,227 B2
(45) Date of Patent: Mar. 31, 2009

(54) CONNECTORS

(75) Inventor: Thomas Stuart Ritchie, Hamilton (NZ)

(73) Assignee: Gallagher Group Limited, Hamilton (NZ)

( * ) Notice: Subject to any disclaimer, the term of this patent is extended or adjusted under 35 U.S.C. 154(b) by 361 days.

(21) Appl. No.: 11/429,339

(22) Filed: May 5, 2006

(65) Prior Publication Data

US 2006/0286874 A1 Dec. 21, 2006

(30) Foreign Application Priority Data

May 5, 2005 (NZ) ...................................... 539887

(51) Int. Cl.
*H01B 17/06* (2006.01)
*E04H 17/10* (2006.01)

(52) U.S. Cl. ................ 174/163 F; 174/161 F; 174/158 F; 174/158 R; 256/47; 256/10

(58) Field of Classification Search ............... 174/45 R, 174/158 R, 158 F, 161 F, 163 R, 163 F, 164, 174/166 R, 169, 172, 135, 161 R; 256/DIG. 3, 256/10, 1, 3, 32, 42, 47, 54–56; D13/129
See application file for complete search history.

(56) References Cited

U.S. PATENT DOCUMENTS

| 3,820,758 | A | * | 6/1974 | Berg, Jr. et al. ............... 256/10 |
| 4,049,905 | A | | 9/1977 | Maranell |
| 4,077,611 | A | | 3/1978 | Wilson |
| D248,750 | S | * | 8/1978 | Langlie et al. ........... 174/158 F |
| D248,850 | S | * | 8/1978 | Berg, Jr. et al. .......... 174/158 F |
| 5,959,255 | A | * | 9/1999 | Langlie et al. ........... 174/161 F |
| 6,296,233 | B1 | | 10/2001 | Berg et al. |
| 7,216,852 | B2 | * | 5/2007 | Gravelle ...................... 256/10 |
| 2003/0116760 | A1 | | 6/2003 | Gravelle |

* cited by examiner

*Primary Examiner*—Angel R Estrada
(74) *Attorney, Agent, or Firm*—Knobbe Martens Olson & Bear LLP

(57) ABSTRACT

The present invention relates to a connector adapted to engage with a support member, preferably being formed with a T-post configuration which provides a plurality of divergent arms. The connector can include a main body adapted to define a central recess and two or more clamping surfaces which extend from the main body. These clamping surfaces are configured to engage with a divergent arm of the support member. The connector when used is engaged with a support member so that at least one divergent arm of the support member is not engaged with a clamping surface.

11 Claims, 2 Drawing Sheets

CONNECTORS

CROSS-REFERENCE TO RELATED APPLICATIONS

This application claims the benefit of New Zealand Patent Application No. 539887, filed May 5, 2005, which is hereby incorporated by reference in its entirety.

FIELD OF THE INVENTION

This invention relates to improvements in or relating to connectors. In particular the present invention may be adapted to provide a connection system for an insulator which is to be connected to a support member with a plurality of divergent arms. In particular, reference will be made to the present invention being used to connect an insulator to a T-post for the purposes of securing an electric fence wire. However those skilled in the art should appreciate that other applications are also envisioned.

DESCRIPTION OF THE RELATED ART

In a number of applications it is preferable to connect articles or loads to various forms of support members. For example, in the case of fencing systems connectors have been developed to connect electrical insulators to conductive metal fence posts.

The connectors developed for this type of application need to provide a secure connection to the support member or post involved, and should prevent the load attached to the post from sliding up or down, or rotating around the post.

One common form of support member used in fencing applications is the "T-post" which includes three divergent arms. The T-post has a centre arm which bisects a pair of front arms orientated in line with one another. T-posts with this basic form have been developed and marketed in varying sizes and shapes depending on the particular application within which the post is to be used. For example, it is possible to obtain T-posts between the sizes of 1¼ quarter inches, 1⅜ inches, and 1½ inches.

As can be appreciated by those skilled in the art, it is difficult to design or provide a connector which can secure an insulator or other forms of load to different sizes of support member and in particular the different sizes of T-post discussed above.

Existing prior art connection systems, such as that disclosed in U.S. Pat. No. 4,049,905 have been designed for a single size of T-post. The construction and form of the connector disclosed cannot be used with larger or smaller versions of the posts which it is to engage with.

This approach in turn increases manufacturing costs as multiple production lines need to be implemented for the multiple designs required, and also increases the storage and stock overheads of suppliers of such connectors. Furthermore, there is also some degree of confusion and complication for users of the connectors provided in that they must ensure they have the correct size connector for the post they will be working with.

An improved connector which addressed any or all of the above problems would be of advantage. In particular, a connector which could secure a load firmly to a range of shape or size posts would be of advantage. A connector which acted as a "universal" connector for various sizes of T-posts which have prevented the load connected from sliding up and down the post, or spinning around the post would also be of advantage.

All references, including any patents or patent applications cited in this specification are hereby incorporated by reference. No admission is made that any reference constitutes prior art. The discussion of the references states what their authors assert, and the applicants reserve the right to challenge the accuracy and pertinency of the cited documents. It will be clearly understood that, although a number of prior art publications are referred to herein, this reference does not constitute an admission that any of these documents form part of the common general knowledge in the art, in New Zealand or in any other country.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

It is an object of the present invention to address the foregoing problems or at least to provide the public with a useful choice.

Further aspects and advantages of the present invention will become apparent from the ensuing description which is given by way of example only.

SUMMARY OF THE INVENTION

According to one aspect of the present invention there is provided a connector adapted to engage with a support member, said support member including a plurality of divergent arms, the connector including,
  a main body adapted to define a central recess, and
  two or more clamping surfaces extending from the main body, said clamping surfaces being adapted to engage with at least one divergent arm of the support member, said clamping surfaces being positioned to engage with regions of the support members divergent arm which have a common position across at least two sizes of support member,
  wherein in use a divergent arm of the support member is not engaged with a clamping surface when the connector is attached to the support member.

According to a further aspect of the present invention there is provided a connector substantially as described above which includes four or more clamping surfaces arranged in paired sets to form two or more jaws, where the paired clamping surfaces forming a jaw engaged with opposite sides of the same divergent arm of a support member when the connector is engaged with the support member.

The present invention is adapted to provide a connector which can be used in a wide number and range of applications. Reference throughout this specification will in general be made to the connector including or being used to attach an electrical insulator to a support member or post. Such a connector may be engaged with the post to locate and secure an electrical insulator with respect to same.

Reference throughout this specification will also be made to the support member or post to which the connector is to be engaged having a plurality of divergent arms. The connector provided may engage with these divergent arms to secure an associated electrical insulator to the support member involved. Preferably the support member to which the connector is to be engaged may be a T-post, which is well known in the agricultural field. T-posts consist of three divergent arms with a centre arm bisecting two front arms orientated substantially parallel to and in line with one another.

Reference throughout this specification will also be made to the present invention providing a connector for an electrical insulator to be attached to a T-post. However, those skilled in the art should appreciate that other applications are also envisioned and reference to the above only throughout this specification should in no way be seen as limiting.

In a preferred embodiment the bulk of the connector may be formed by a main body. This main body may provide a centre section with side wings extending from each of two ends of the central section defining and at least partially enclosing a central recess. When the connector is used, a T-post may be inserted within this central recess to sit between the two side wings of the main body.

In a preferred embodiment the connector provided may engage with the two front arms of the T-post, where these arms are orientated preferably substantially parallel to one another. The connector need not engage with the centre arm of the T-post.

In a preferred embodiment the two side wings may be formed from a resilient material.

In a preferred embodiment the two side wings of the main body may be resiliently deformed to allow the entry of the front arms of a T-post into the central recess of the connector. In a further preferred embodiment a user operable pull tab may be located at the free end of each side wing of the main body, allowing a user to pull either of the side wings outwards away from the central recess of the connector when a T-post is being inserted into this central recess. The resilient nature of these side wings may then allow each wing to return back to its original shape or form to engage with the T-post.

In a preferred embodiment a clamping surface may be formed from a projection which extends out from the central section of the connector.

In a further embodiment a clamping surface may be formed from a portion of a side wing.

In a preferred embodiment the connector may include at least two clamping surfaces which extend from the main body. These clamping surfaces may be adapted to engage with at least one, and preferably two of the divergent arms of the T-post.

Preferably these clamping surfaces may be arranged to provide at least one set of jaws from a paired set of clamping surfaces which are to be engaged with opposite sides of the same divergent arm of a T-post.

In a further preferred embodiment the connector provided may include at least four clamping surfaces arranged in two paired sets of jaws, where at least one set of jaws is engaged with each of the two front arms of a T-post.

A clamping surface as discussed throughout this specification may be defined as any surface adapted to bear against a surface of at least one divergent arm of the support member. A clamping surface can assist in clamping the support member in place in conjunction with a further clamping surface bearing against the opposite side or face of the same divergent arm. Preferably such clamping surfaces may be formed by projections which extend out from the main body, from either the centre section of the main body, or either, or both of the two side wings of the main body.

In a further preferred embodiment the connector may be provided with four jaws implemented through six clamping surfaces. A pair of clamping surfaces may extend from the interior side of the centre section of the main body, where these centre section surfaces extend some distance down the length of the two front arms of the T-post to be engaged. The two front arms of the T-post may be clamped against a further two sets of two clamping surfaces provided on each side wing of the main body. The two front arms of the T-post may then be anchored or clamped in place at four independent points under the action of these six surfaces forming four sets of jaws.

Preferably the clamping surfaces provided may only engage or bear against surfaces of the T-post which have a common position across all different sizes of T-posts with which the present invention is to be employed. Such common surfaces may be identified, for example, by a superposition of plain views of various sizes of T-posts on top of one another. By configuring the connector provided to engage with such common surfaces this allows the invention to form a "universal" connector capable of engaging with a number of different sizes of T-posts.

In a preferred embodiment the connector may also include at least one slide inhibitor. A slide inhibitor may be adapted to prevent the connector sliding up or down the entire length of a T-post when the connector is engaged with the post. In a further preferred embodiment a slide inhibitor may be formed by a further projection located on the interior side or face of the main bodies' centre section which will engage with corresponding projections or bumps formed in the front face of the T-post between its two front arms. This slide inhibiting projection or projections will therefore run up against such corresponding projections on the front face of the T-post to prevent the connector from sliding.

The present invention may provide many potential advantages over the prior art.

The present invention may be used to provide a "universal" connector which can engage with a number of different shapes or sizes of support members. In particular, a connector formed in accordance with a preferred embodiment may engage with a number of different sizes or shapes of T-posts to secure or engage a load with same.

Preferably the connector provided may also prevent the load it supports from sliding up or down or rotating around the post involved.

Further aspects of the present invention will become apparent from the following description which is given by way of example only and with reference to the accompanying drawings.

DETAILED DESCRIPTION OF THE PREFERRED EMBODIMENT

Figure 1A:
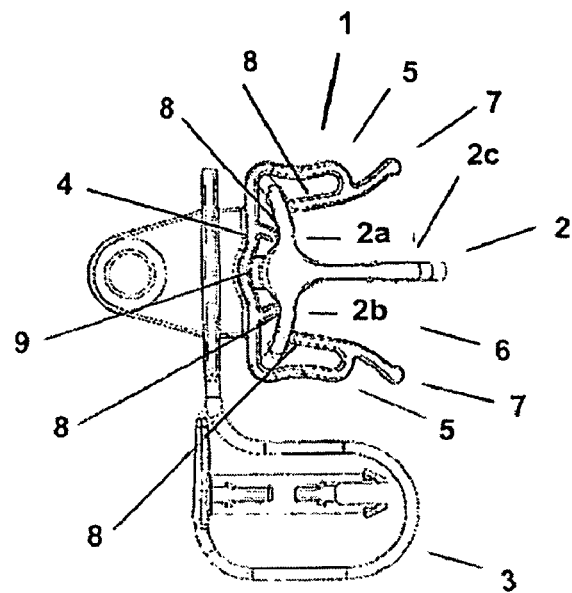
FIGS. 1. (*a* and *b*) Show top and perspective views of a connector provided in accordance with a preferred embodiment.
Figure 1B:
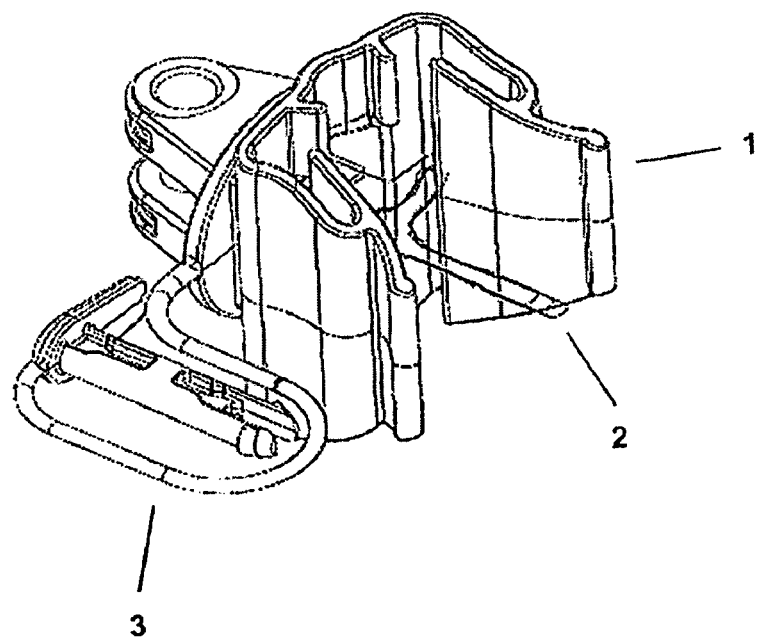

FIGS. 1*a* and 1*b* show top and perspective views of a connector provided in accordance with a preferred embodiment.

In the views shown the connector (1) is engaged with a support member, shown in this embodiment as a T-post (2). The connector (1) is engaged with the T-post (2) to support a load formed by an electric fence wire connector (3). The wire connector, and the main connector (1) are formed from an electrically insulative material to prevent the electrical current transmitted along the wire held by the wire connector (3) from finding a path to ground through the T-post (2).

As can be seen from FIGS. 1a and 1b the T-post (2) consists of a pair of front arms 2a, 2b which are bisected by a centre arm 2c.

In the embodiment shown the connector (1) consists of a main body formed by a centre section (4) which has a pair of side wings (5) projecting from its ends to define a central recess (6).

At the end of each side wing (5) is a pull tab (7) which allows a user to resiliently deform each wing outwards, allowing the T-post to be inserted into the central recess (6).

In the embodiment shown the connector (1) is adapted to engage with the two front arms, 2a, 2b of the T-post. Connector (1) engages with these side arms through the provision of a set of clamping surfaces (8). These clamping surfaces (8) extend out from the main body, be it from the central section (4) or either of the side wings (5).

In the embodiments shown these clamping surfaces (8) form pairs of jaws which act on the opposite sides of the same front arm of the T-post to clamp against the arm and engage it with the connector.

In the embodiments shown six clamping surfaces (8) are provided, where two of these surfaces are used twice to form four sets of jaws which are engaged with the two front arms of the T-post. The clamping surfaces (8) which extend from the central section of the main body are used twice in this instance.

The connector (1) also includes a slide inhibitor (9). This slide inhibitor is formed by a projection extending out from the centre section of the main body which in use is to engage with a corresponding projection extending out from the front face of the T-post. If the connector is sliding up or down the T-post this slide inhibiting projection (9) will prevent further movement of the connector relative to the post. As can be appreciated by those skilled in the art, the design and form of the resiliently deformable side wings (5) also prevents the connector from spinning or rotating relative to the T-post (2).

Figure 2:
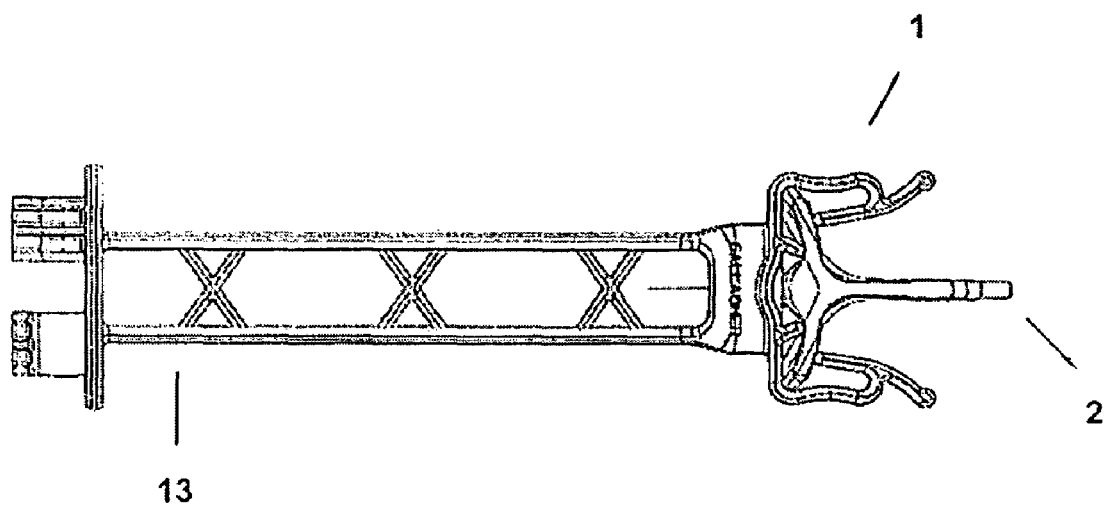
FIG. 2. Shows the same connector of FIGS. 1*a* and 1*b* with an alternative form of load illustrated.

FIG. 2 illustrates the same form of connector (1) engaged with a different form of load (13). In the embodiment shown again an insulated electric fence line retainer is provided as the load (13) with a differing form of attachment of the load (13) to the connector (1).

FIG. 2 also shows the various range of sizes of T-post (2) which may be engaged by the connector (1). This can be seen from the views FIGS. 1a, 1b, and 2 showing a T post (2) where the various lengths of the arms of different sized T-posts are over marked on one another.

Aspects of the present invention have been described by way of example only and it should be appreciated that modifications and additions may be made thereto without departing from the scope thereof as defined in the appended claims.

What is claimed is:

1. A connector adapted to engage with a support member, said support member including a plurality of divergent arms, the connector comprising,
   a main body adapted to define a central recess configured to accept at least two divergent arms of the support member, and
   at least four clamping surfaces extending from the main body into the central recess, the clamping surfaces arranged in parallel sets to form two or more jaws, wherein each of the paired sets of clamping surfaces is configured to engage with opposite sides of one of said divergent arms of the support member, said paired sets of clamping surfaces being positioned to engage with regions of the support member's divergent arm which have a common position across at least two sizes of support member,
   wherein in use, each of the two divergent arms of the support member accepted into the central recess is engaged with at least one of the paired sets of clamping surfaces, and at least one divergent arm of the support member is not engaged with a clamping surface when the connector is attached to the support member.

2. A connector as claimed in claim 1 wherein the connector is configured to engage two arms only of a support member, with these two arms being orientated substantially parallel to one another.

3. A connector as claimed in claim 1 wherein the main body is formed from a center section with a side wing extending from each of two ends of said center section, wherein the center section and two side wings at least partially enclose the central recess defined by the main body.

4. A connector as claimed in claim 1 wherein the connector is configured to engage with a support member formed as a T-post.

5. A connector as claimed in claim 1 wherein the connector includes an electrically insulative element.

6. A connector as claimed in claim 3 wherein a clamping surface is formed from a projection which extends out from the central section of the connector.

7. A connector as claimed in claim 3 wherein a clamping surface is formed from a portion of a side wing.

8. A connector as claimed in claim 3 wherein the two side wings are formed from a resilient material.

9. A connector as claimed in claim 8 which includes at least one user operable pull tab configured to allow a user to pull a side wing away from the central recess of the connector.

10. A connector as claimed in claim 3 which includes at least one slide inhibitor.

11. A connector as claimed in claim 10 wherein a slide inhibitor is formed by a projection extending out from the central section into the central recess.

* * * * *